(12) United States Patent
Hu et al.

(10) Patent No.: US 12,504,874 B2
(45) Date of Patent: Dec. 23, 2025

(54) HUMAN-MACHINE INTERACTION DEVICE TOUCH-INTERACTION CONTROL BASED ON USER-DEFINED PARAMETERS

(71) Applicant: Honda Motor Co., Ltd., Tokyo (JP)

(72) Inventors: Yuhan Hu, Santa Clara, CA (US);
Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/604,317

(22) Filed: Mar. 13, 2024

(65) Prior Publication Data

US 2025/0291473 A1    Sep. 18, 2025

(51) Int. Cl.
*G06F 3/0488* (2022.01)
*B25J 9/16* (2006.01)

(52) U.S. Cl.
CPC .............. *G06F 3/0488* (2013.01); *B25J 9/16* (2013.01)

(58) Field of Classification Search
None
See application file for complete search history.

(56) References Cited

U.S. PATENT DOCUMENTS

| | | | | |
|---|---|---|---|---|
| 2017/0181802 | A1* | 6/2017 | Sachs | A61B 90/361 |
| 2019/0258239 | A1* | 8/2019 | Floreano | A63G 31/16 |
| 2020/0039073 | A1* | 2/2020 | Diankov | B25J 9/1669 |
| 2021/0122045 | A1* | 4/2021 | Handa | B25J 13/084 |
| 2022/0361966 | A1* | 11/2022 | Khalifa | A61B 34/74 |
| 2023/0039524 | A1* | 2/2023 | Bhageria | B25J 11/0045 |
| 2024/0066695 | A1* | 2/2024 | Power | B25J 9/1689 |
| 2024/0091938 | A1* | 3/2024 | Aguilera | B25J 15/0009 |
| 2024/0424663 | A1* | 12/2024 | Küçüktabak | B25J 3/00 |

OTHER PUBLICATIONS

Airosa, et al., "Tactile massage as part of the caring act: A qualitative study in short-term emergency wards", Qualitative Research, Journal of Holistic Nursing, Sep. 16, 2015, 11 pages.

(Continued)

*Primary Examiner* — Stephen T. Reed
(74) *Attorney, Agent, or Firm* — Suzanne Gagnon; American Honda Motor Co., Inc.

(57) ABSTRACT

An electronic device and a method for human-machine interaction (HMI) device touch-interaction control based on user-defined parameters. The electronic device controls rendering of a first electronic user interface (UI) including first UI elements for input of parameters for touch-interaction of HMI device with a user. The electronic device receives a first user input indicative of parameters through the first electronic UI and controls the HMI device to operate based on first user input. The electronic device controls rendering of a second electronic UI including second UI elements for input of a user-feedback associated with the touch-interaction of the HMI device. The electronic device receives a second user input indicative of a user-feedback through the second electronic UI. The electronic device modifies parameters based on second user input and controls the HMI device to operate based on the modified parameters.

20 Claims, 9 Drawing Sheets

(56) References Cited

OTHER PUBLICATIONS

Cocksedge, et al., "Touch in primary care consultations: qualitative investigation of doctors' and patients' perceptions", British Journal of General Practice, Apr. 2013, 08 pages.

Connor, et al., "Intentional comfort touch a conceptual model", Journal of Holistic Nursing, 2009, pp. 127-135.

Figma, 2023, URL: https://www.figma.com/.

Haddadin, et al., "Requirements for safe robots: Measurements, analysis and new insights", The International Journal of Robotics Research, Aug. 20, 2009, 21 pages.

Haddadin, et al., "The Franka Emika Robot: A Reference Platform for Robotics Research and Education", IEEE Robotics & Automation Magazine, vol. 29, Issue: 2, Jun. 2022, pp. 46-64.

Hamad, et al., "A Concise Overview of Safety Aspects in Human-Robot Interaction", arXiv, Safety Aspects in Human-Robot Interaction, Sep. 18, 2023, 15 pages.

Hollinger, et al., "Factors influencing the perception of touch by elderly nursing home residents and their health caregivers", International Journal of Nursing Studies, vol. 30, Issue 5, Oct. 1993, pp. 445-461.

Law, et al., "A touching connection: how observing robotic touch can affect human trust in a robot", International Journal of Social Robotics, Jan. 5, 2021, 17 pages.

O'Lynn, et al., "How Should I Touch You?': A Qualitative Study of Attitudes on Intimate Touch in Nursing Care", The American Journal of Nursing, 2011, 9 pages.

Pedrazza, et al., "Variables of Individual Difference and the Experience of Touch in Nursing", Western Journal of Nursing Research, 2018, pp. 1614-1637.

Pedrazza, et al., "Development and Initial Validation of the Nurses' Comfort With Touch Scale", Springer Publishing Company, 2015, pp. 364-378.

Qbrobotics, qb SoftHand2 Research, 2023, URL: https://qbrobotics.com/product/qb-softhand-2-research/.

Pirkko Routasalo, "Physical touch in nursing studies: a literature review", Journal of Advanced Nursing, Dec. 25, 2001.

Thompson, et al., "Social factors in human-robot interaction", In Human-robot interactions in future military operations CRC Press, 2016, pp. 67-82.

Erp, et al., "How to touch humans: Guidelines for social agents and robots that can touch", In 2013 humaine association 4conference on affective computing and intelligent interaction, IEEE, 2013, pp. 780-785.

Willemse, et al., "Social Touch in Human-Robot Interaction: Robot-Initiated Touches can Induce Positive Responses without Extensive Prior Bonding", International Journal of Social Robotics, Nov. 8, 2018, pp. 285-304.

Yohanan, et al., "The role of affective touch in human-robot interaction: Human intent and expectations in touching the haptic creature", International Journal of Social Robotics, 2012, pp. 163-180.

\* cited by examiner

HUMAN-MACHINE INTERACTION DEVICE TOUCH-INTERACTION CONTROL BASED ON USER-DEFINED PARAMETERS

BACKGROUND

Advancements in the field of engineering and technology have led to the development and proliferation of various human-machine interaction (HMI) devices, such as, robots. Recently, robots are increasingly being used to perform or assist in many complex and risky tasks, such as, for remote robotic surgeries. Such tasks require accuracy and precision in timing and motion of robotic arms. Also, in context of physical Human-Robot Interaction (pHRI), end-user experience may be difficult to recreate through a tele-medium. Most existing HMI devices may use heuristic-based techniques to recreate the end-user experience. While there are several exploratory methods available, such methods may primarily rely on interview-driven processes with minimal exposure to the actual interaction experience. Some research in the pHRI domain uses pre-recorded videos as discussion prompts for interviews or workshops. However, all such existing methods may not be able to provide a realistic estimation of the end-user experience and the inability to provide an accurate estimation may increase the risk involved in the already complex HMI tasks.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for Human-Machine Interaction (HMI) device touch-interaction control based on user defined parameters is provided. The electronic device may include circuitry that may be configured to control rendering of a first electronic User Interface (UI) including first UI elements for input of parameters associated with a touch-interaction of the HMI device with a user. The circuitry may be further configured to receive a first user input indicative of the parameters based on the control of the rendering of the first electronic UI, and control the HMI device to operate based on the received first user input. The circuitry may be further configured to control rendering of a second electronic UI including second UI elements for input of a user-feedback associated with the touch-interaction of the HMI device, based on the control of the HMI device. The circuitry may be further configured to receive a second user input indicative of the user-feedback based on the control of the rendering of the second electronic UI. Furthermore, the circuitry may be further configured to modify the parameters based on the received second user input, and control the HMI device to operate based on the modified parameters.

According to another embodiment of the disclosure, a method for Human-Machine Interaction (HMI) device touch-interaction control based on user defined parameters is provided. The method may include control of rendering of a first User Interface (UI) including first UI elements for input of parameters associated with a touch-interaction of the HMI device with a user. The method may further include reception of a first user input indicative of the parameters based on the control of the rendering of the first electronic UI. The method may further include control of rendering of a second electronic UI including second UI elements for input of a user-feedback associated with the touch-interaction of the HMI device, based on the control of the HMI device. The method may further include reception of a second user input indicative of the user-feedback based on the control of the rendering of the second electronic UI. The method may further include modification of the parameters based on the received second user input. The method may further include controlling the HMI device to operate based on the modified parameters.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include controlling rendering of a first User Interface (UI) including first UI elements for input of parameters associated with a touch-interaction of the HMI device with a user. The operations may further include reception of a first user input indicative of the parameters based on the control of the rendering of the first electronic UI. The operations may further include control of rendering of a second electronic UI including second UI elements for input of a user-feedback associated with the touch-interaction of the HMI device, based on the control of the HMI device. The operations may further include reception of a second user input indicative of the user-feedback based on the control of the rendering of the second electronic UI. The operations may further include modification of the parameters based on the received second user input. The operations may further include controlling the HMI device to operate based on the modified parameters

DETAILED DESCRIPTION

The following described implementation may be found in an electronic device and method for human-machine interaction (HMI) device touch-interaction control based on user defined touch-interaction parameters. Exemplary aspects of the disclosure may provide an electronic device (for example, a mobile phone, a smart phone, a desktop, a laptop, a personal computer, and the like) that may control rendering of a first electronic user interface (UI) including first UI elements (for example, icons, sliders, and buttons) for input of parameters (for example, speed, force, and time) associated with a touch-interaction of the HMI device (for example, robots). Next, the electronic device may receive a first user input indicative of the parameters based on the control of the rendering of the first electronic UI. Further, the electronic device may control the HMI device to operate based on the received first user input. Further, the electronic device may also control rendering of a second electronic UI including second UI elements for input of a user-feedback associated with the touch-interaction of the HMI device, based on the control of the HMI device. Furthermore, the electronic device may receive a second user input indicative of the user-feedback based on the control of the rendering of the second electronic UI and modify the parameters based on the received second user input. Furthermore, the electronic device may control the HMI device to operate based on the modified parameters.

The electronic device of the disclosure may enable use of pHRI to help in the design process of an HMI device such that the end-users may work with robot-experts to program robotic actions, based on actual human-robot interactions of the end-users. For example, based on feedback from the end-users; paths of the HMI device may be defined, force, speed, and/or time parameters may be configured and physical material preferences may be recorded. Also, the HMI device can be controlled to operate based on the end-user feedback. The method includes a two-step co-design experiment, a user interface that helps users select robot settings, and evaluation tools that measure the interaction experience of the user with the robot using both numbers and words, with an emphasis on safety and comfort. Therefore, both qualitative measures and quantitative measures may be used to enhance user experience of the HMI devices, focusing on perceived safety and comfort. This may further increase accuracy and precision of the HMI device in performing the relevant action involving an end-user.

Figure 1:
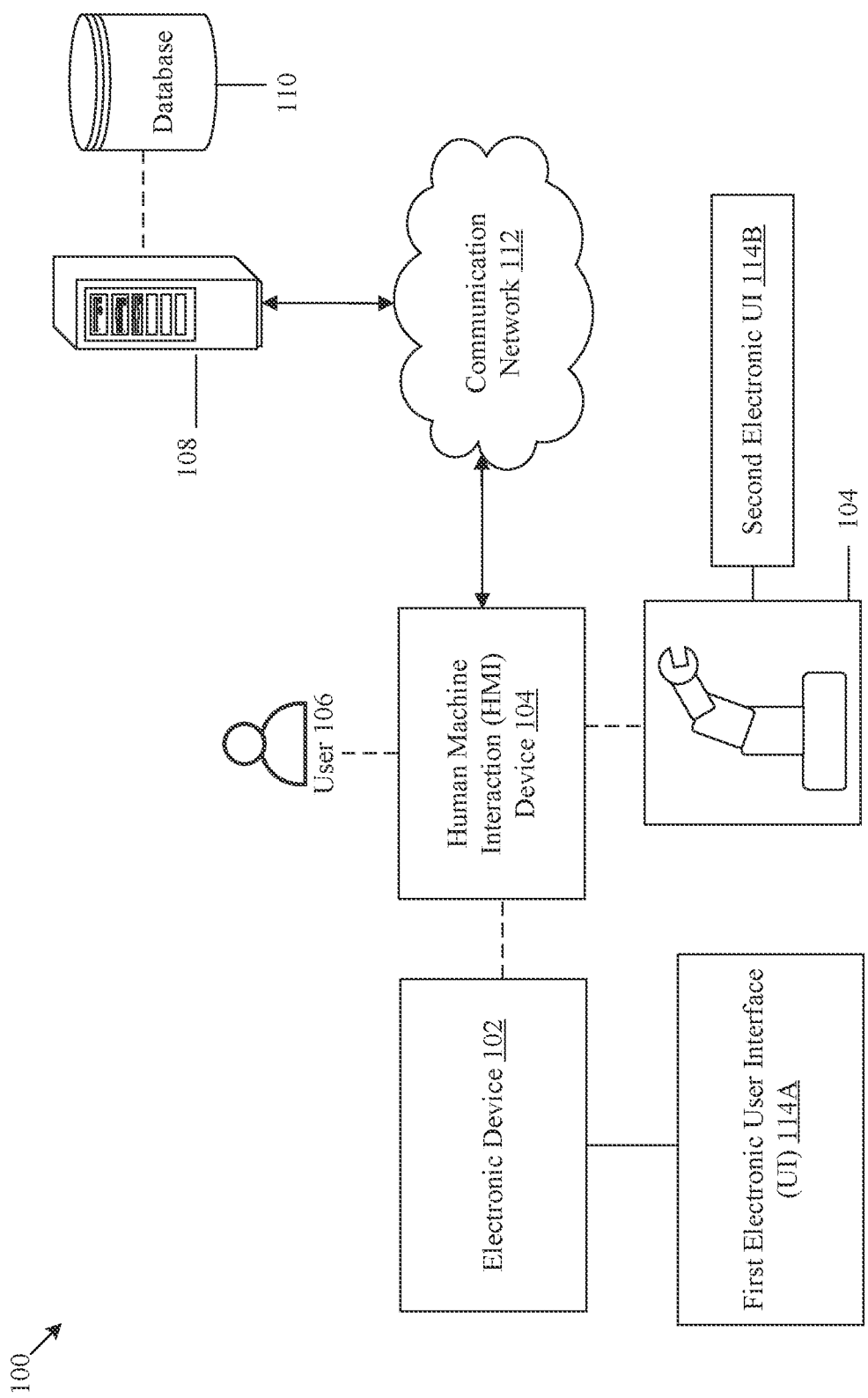
FIG. 1 is a diagram that illustrates an exemplary network environment for HMI device touch-interaction control based on user defined parameters, in accordance with an embodiment of the disclosure.

FIG. 1 is a diagram that illustrates an exemplary network environment for HMI device touch-interaction control based on user defined parameters, in accordance with an embodiment of the disclosure. With reference to FIG. 1, there is shown a network environment 100. The network environment 100 includes an electronic device 102, a Human Machine Interaction (HMI) device 104, a server 108, a database 110, and a communication network 112. The electronic device 102, the HMI device 104, and the server 108 may communicate with one another through one or more networks (such as, the communication network 112). The server 108 may be associated with the database 110. The electronic device 102 may include a first electronic User Interface (UI) 114A. The HMI device 104 may include a second electronic UI 114B. The electronic UI may be configured to render UI elements (for example, icons, sliders, and buttons) for input of parameters (for example, speed, force, and time) associated with a touch-interaction of an HMI device 104 (for example, robots). In another embodiment, the first electronic UI 114A and the second electronic UI 114B may be associated with the electronic device 102. In yet another embodiment, the first electronic UI 114A and the second electronic UI 114B may be associated with the HMI device 104.

In FIG. 1, there is also shown, a user 106 who may be associated with (or who may operate) the electronic device 102 and/or the HMI device 104. Though only one user (i.e., the user 106) is shown in FIG. 1, the scope of the disclosure may not be so limited. In some embodiments, a first user (e.g., a remote operator or a surgeon) may be associated with the electronic device 102. Further, a second user (different from the first user), for example, an end-user, such as, a patient, may be associated with (or may interact with) the HMI device 104.

The electronic device 102 may include suitable logic, circuitry, interfaces, and/or code that may be configured to control a touch-interaction of the HMI device 104 based on user defined parameters. The electronic device 102 may control rendering of the first electronic UI 114A including UI elements for input of parameters associated with a touch-interaction of an HMI device (e.g., the HMI device 104). The electronic device 102 may further receive a first user input indicative of the parameters based on the control of the rendering of the first electronic UI 114A. The electronic device 102 may control the HMI device 104 to operate based on the received first user input. The electronic device 102 may control rendering of the second electronic UI 114B including second UI elements for input of a user-feedback associated with the touch-interaction of the HMI device 104, based on the control of the HMI device 104. In an example, the second electronic UI 114B may be hosted on the HMI device 104. The electronic device 102 may transmit instructions to the HMI device 104 to control the rendering of the second electronic UI 114B. The electronic device 102 may receive a second user input indicative of the user-feedback associated with the touch-interaction, based on the control of the rendering of the second electronic UI 114B. The electronic device 102 may modify the parameters based on the received second user input. Further, the electronic device 102 may control the HMI device 104 to operate based on the modified parameters. Examples of the electronic device 102 may include, but may not be limited to, a desktop, a tablet, a television (TV), a laptop, a computing device, a smartphone, a cellular phone, a mobile phone, a consumer electronic (CE) device having a display.

The HMI device 104 may include suitable logic, circuitry, interfaces, and/or code that may be configured to perform a predetermined set of actions that may involve a touch-based interaction with one or more users. The operations of the HMI device 104 may be controlled based on user inputs and/or instructions received from the electronic device 102. In an example, the HMI device 104 may host an electronic UI (such as, the second electronic UI 114B). The second electronic UI 114B may enable reception of the second user input indicative of the user-feedback associated with the touch-interaction of the HMI device 104 with the one or more users, such as, the user 106. Based on the reception of the second user input, parameters associated with the operation of the HMI device 104 may be modified. The operations of the HMI device 104 may be accordingly controlled (e.g., based on the modified parameters). Examples of the HMI device 104 may include, but may not be limited to, a robotic arm, a humanoid, a human-interfaced machine, an industrial machine, or any device including software and hardware for touch-based human-machine interaction.

The server 108 that may include suitable logic, circuitry, interfaces, and/or code configured to receive requests from the electronic device 102 to receive parameters from the user 106. The server 108 may be configured to extract input parameters associated with the touch-interaction of the HMI device 104. Further, the server 108 may be configured to extract user input indicative of the parameters based on the control of the rendering of the electronic UI (for example, first electronic UI 114A). The server 108 may be configured to extract a user-feedback associated with the touch-interaction of the HMI device 104. The server 108 may transmit the user-feedback based on the control of the rendering of the electronic UI. In an embodiment, the server 108 may be configured to receive the parameters given as user input, such as, trajectory values associated with a motion of the HMI device 104, pose parameters associated with the HMI device 104, force parameters associated with the HMI device 104, time parameters associated with the touch-interaction and the motion of the HMI device 104, speed parameters associated with the HMI device 104, arm-motion parameters associated with the HMI device 104, and the like. In addition, in certain scenarios, the server 108 may transmit instructions associated with control of the operations of the HMI device 104, based on the input of parameters by the user (e.g., the user 106).

The server 108 may execute operations through web applications, cloud applications, HTTP requests, repository operations, file transfer, and the like. Example implementations of the servers 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as separate entities.

The database 110 may include suitable logic, circuitry, interfaces, and/or code configured to store information related to the first user input and the second user input (e.g., the user-feedback) received from the user (e.g., the user 106). Further, the database 110 may store information associated with instructions associated with operation of the HMI device 104. For example, the database 110 may store a mapping table including predefined instructions associated with different values of the parameters to control the operations of the HMI device 104. The database 110 may be derived from data of a relational or non-relational database or a set of comma-separated values (csv) files in conventional or big-data storage. The database 110 may be stored or cached on device or server, such as the server 108. The device storing the database 110 may be configured to query the database 110 for certain information (such as, the information related to the first user input and/or the second user input, and the information related to the mapping table) based on reception of a request for the particular information from the electronic device 102. In response, the device storing the database 110 may be configured to retrieve, from the database 110, results (for example, a user input of the parameters, user-feedback associated with the touch-interaction, and/or the mapping table) based on the received query.

In some embodiments, the database 110 may be hosted on a server 108 located at same or different locations. The operations of the database 110 may be implemented using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 112 may include a communication medium through which the electronic device 102, HMI device 104, and the server 108 may communicate with each other. The communication network 112 may be a wired or wireless communication network 112. Examples of the communication network 112 may include, but are not limited to, Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to control rendering of the first electronic UI 114A including first UI elements for input of parameters associated with a touch-interaction of a Human-Machine Interaction (HMI) device (e.g., the HMI device 104) with a user (e.g., the user 106). In an example, the input parameters may include, but are not limited to, trajectory values associated with a motion of the HMI device 104, pose parameters associated with the HMI device 104, force parameters associated with the HMI device 104, time parameters associated with a touch-interaction and a motion of the HMI device 104, speed parameters associated with the HMI device 104, and arm-motion parameters associated with HMI device 104.

The first electronic UI 114A may render UI elements indicative of first user-selectable items to set trajectory values of the HMI device 104. The trajectory values may include, but are not limited to, a task space for the HMI device 104 and a joint space for the HMI device 104. The task space may be waypoints and interpolation, which may indicate a position and a direction of the arm of the robot including a pose and an orientation at a specific location. For example, the trajectory values may be represented as "Start (Point A): Position=0, Time=0" and "End (Point B): Position=1, Time=2". The trajectory values may be user-selectable items.

In an embodiment, the pose parameters may refer to the position and orientation of the HMI device 104 or a part of the HMI device 104 in relation to a fixed coordinate system. The position can be described by a vector of coordinates, such as (x, y, z), while the orientation can be described by a matrix of angles, such as [$\alpha$, $\beta$, $\gamma$]. The pose parameters may control the motion and interaction of the HMI device 104 with its environment. The environment may be a physical and social context in which the HMI device 104 may operate and interact. The environment can affect the perception, localization, navigation, and manipulation capabilities of the HMI device 104 and may pose other challenges for the development, distribution, and use of the HMI device 104.

The force parameters associated with the HMI device 104 may include contact forces that may act on the HMI device 104 or a part of the HMI device 104 during its motion and manipulation. The Contact forces can affect the position, velocity, acceleration, and stability of the HMI device 104, as well as the perception, planning, and control capabilities of the HMI device 104. The time parameters associated with the touch-interaction and the motion of the HMI device 104 may refer to the relationship between forces/torques and motion (in joint space or workspace variables). The speed parameters associated with the HMI device 104 may refer to for example, 'velocity', 'acceleration', and so on. The speed parameters may affect the HMI device 104 or a part of the HMI device 104 during its motion and manipulation. The speed parameters may affect position, stability, and performance of the HMI device 104, as well as perception, planning, and control capabilities of the HMI device 104. Further, the arm-motion parameters in the HMI device 104 may define and control the movement of one or more arms of the HMI device 104. The arm-motion parameters in the HMI device 104 may include for example, joint angles, position and orientation, velocity and acceleration, trajectory, force and torque.

The first electronic UI 114A may include UI elements (for example, first UI elements) for input of the parameters associated with the touch-interaction of the HMI device 104 with a user, such as, the user 106. The first UI elements may include for example, but not limited to, 'adding waypoint', 'adding hand pose', 'applying force', 'adding time constraint', 'adding arm-motion parameters of the HMI device 104, and the like. In an example, the first electronic UI 114A may be hosted on the electronic device 102. In another embodiment, the first electronic UI 114A may be hosted on the HMI device 104. A user input corresponding to addition of one or more parameters as UI elements of the first electronic UI 114A may be rendered on the first electronic UI 114A. The user 106 may select the parameters such as, but not limited to, trajectory values associated with a motion of the HMI device 104, pose parameters associated with the HMI device 104, force parameters associated with the HMI device 104, time parameters associated with the touch-interaction and the motion of the HMI device, speed parameters associated with the HMI device 104, speed parameters associated with the HMI device 104, and arm-motion parameters associated with the HMI device 104.

The electronic device 102 may be configured to receive a first user input indicative of the parameters, based on the control of the rendering of the first electronic UI 114A. The first user input may indicate values of user-selected parameters that may be set by the user 106. For example, the first user input may indicate values of the force parameter, the waypoint/trajectory, and the time duration. In an example, the force parameter may be set as "15N", the waypoint/trajectory may be set as a path between a first point "A" and a second point "B", and the time duration may be set as 10 seconds starting from 3.40:00 PM to 3.40:10 PM. The control of the rendering of the first electronic UI and the receipt of the first user input are described further, for example, in FIG. 4 (at 402 and 404, respectively).

The electronic device 102 may be configured to control the HMI device 104 to operate based on the control of the rendering of the first electronic UI 114A. For example, the first user input may be indicative of the parameters to be used to control the HMI device 104. The electronic device 102 may query the server 108 (and/or the database 110) to extract a set of instructions associated with the parameters indicated in the first user input. Based on the extracted set of instructions, the electronic device 102 may control the operation of the HMI device 104. In another example, the electronic device 102 may transmit the parameters received in the first user input to the server 108 (and/or the database 110). The server 108 (and/or the database 110) may retrieve the set of instructions associated with the parameters and control the operation of the HMI device 104, based on the set of instructions. In an embodiment, the set of instructions may correspond to a set of programming instructions based on which the HMI device 104 may execute a set of predetermined actions. The control of the operation of the HMI device is described further, for example, in FIG. 4 (at 406).

The electronic device 102 may be configured to control the rendering of the second electronic UI 114B including second UI elements for input of a user-feedback associated with the touch-interaction of the HMI device 104, based on the control of the HMI device 104. In an example, based on the control of the HMI device 104 by the electronic device 102, the HMI device 104 may execute certain actions and interact with the user 106. The interaction may include a touch-based interaction. The user 106 may wish to provide feedback associated with the touch-interaction. The electronic device 102 and/or the HMI device 104 may host the second electronic UI 114B and provide second UI elements for the user 106 to provide the feedback associated with the touch-interaction of the user 106 with the HMI device 104. The control of the rendering of the second electronic UI is described further, for example, in FIG. 4 (at 408).

The electronic device 102 may be configured to receive a second user input indicative of the user-feedback associated with the touch-interaction, based on the control of the rendering of the second electronic UI 114B. For example, the electronic device 102 may receive the second user input including the user-feedback to the touch-interaction of the HMI device 104 with the user 106, through the second electronic UI 114B (e.g., via the second UI elements) that may rendered by the electronic device 102 (and/or the HMI device 104). The receipt of the second user input is described further, for example, in FIG. 4 (at 410).

The electronic device 102 may be configured to modify the parameters based on the received second user input. For example, the second user input may include the user-feedback associated with the touch-interaction of the HMI device 104 with the user 106, wherein the user-feedback may include modified values of certain parameters to control the operation of the HMI device 104. The electronic device 102 may be configured to control the HMI device 104 to operate based on the modified parameters. The modification of the parameters and the control of the operations of the HMI device based on the modified parameters are described further, for example, in FIG. 4 (at 412 and 414, respectively).

Figure 2:
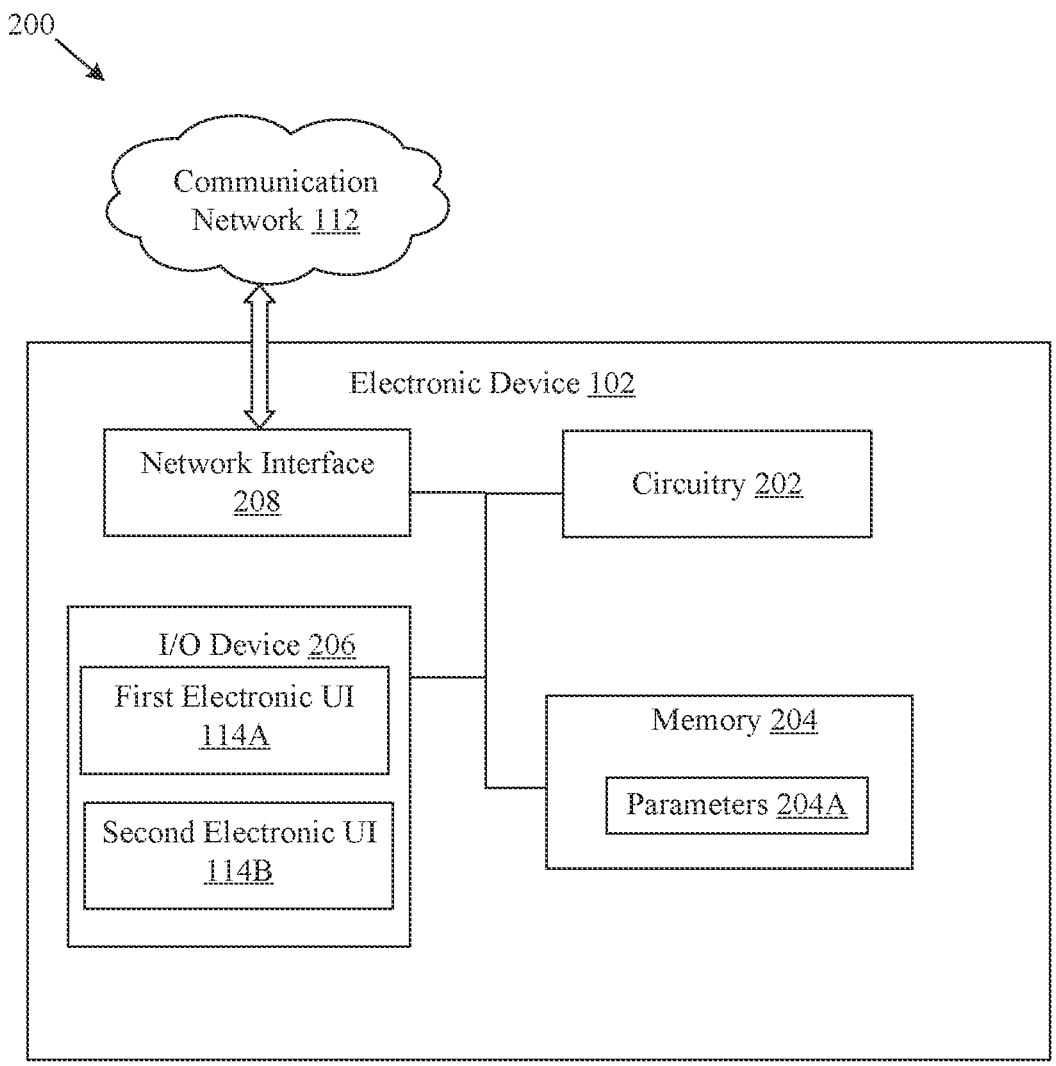
FIG. 2 is a block diagram that illustrates an exemplary electronic device of FIG. 1, for HMI device touch-interaction control based on user defined parameters, in accordance with an embodiment of the disclosure.

FIG. 2 is a block diagram that illustrates an exemplary electronic device of FIG. 1, for HMI device control based on user defined parameters, in accordance with an embodiment of the disclosure. FIG. 2 is explained in conjunction with elements from FIG. 1. With reference to FIG. 2, there is shown a block diagram 200 of the electronic device 102. The electronic device 102 may include a circuitry 202, a memory 204, an input/output (I/O) device 206, and a network interface 208. In at least one embodiment, the I/O device 206 may also include the first electronic UI 114A and the second electronic UI 114B. In at least one embodiment, the memory 204 may include parameters 204A. The circuitry 202 may be communicatively coupled to the memory 204, the I/O device 206, the network interface 208, through wired or wireless communication medium associated with the electronic device 102.

The circuitry 202 may include suitable logic, circuitry, and interfaces that may be configured to execute program instructions associated with different operations to be executed by the electronic device 102. The operations may include controlling rendering of the first electronic UI 114A including first UI elements for input of parameters 204A associated with a touch-interaction of the HMI device 104. The operations may further include reception of the first user input indicative of the parameters 204A based on the control of the rendering of the first electronic UI 114A. The operation may include control of the operation of the HMI device 104 based on the received first user input. The operations may include control rendering of the second electronic UI 114B including the second UI elements for the input of a user-feedback associated with the touch-interaction of the HMI device 104, based on the control of the HMI device 104. The second user input may be received indicative of the user-feedback based on the control of the rendering of the second electronic UI. Further, the operation may include modification of the parameters 204A based on the received second user input and the HMI device 104 may be controlled to operate based on the modified parameters 204A.

The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the electronic device 102). In at least one embodiment, the memory 204 may store the parameters 204A. The parameters 204A may include, for example, but not limited to trajectory values associated with a motion of the HMI device 104, pose parameters associated with the HMI device 104, force parameters associated with the HMI device 104, time parameters associated with the touch-interaction and the motion of the HMI device 104, speed parameters associated with the HMI device 104, speed parameters associated with the HMI device 104, and arm-motion parameters associated with the HMI device 104. The memory 204 may further store various values for the parameters 204A such as the force parameter may be set as "15N", the waypoint/trajectory may be set as a path between a first point "A" and a second point "B", and the time duration may be set as 10 seconds starting from 3.40:00 PM to 3.40:10 PM. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input, for example, the first user input that may be indicative of the parameters 204A (for example, speed, force, pose and the like), which may be used to control an operation of the HMI device 104. In some embodiments, the I/O device 206 may receive the second user input that may be indicative of the user-feedback of the touch-interaction of the HMI device 104. The second user input may include modified values of the parameters 204A to further control the operations of the HMI device 104. In an embodiment, the I/O device 206 may render the current values of the parameters 204A. The current values may either be default or predefined values of the parameters 204A or may be previously set values of the parameters 204A. touch-interaction. Examples of the I/O device 206 may include, but are not limited to, a touch screen, a keyboard, a mouse, a joystick, a microphone, the display device 102B, and a speaker. Examples of the I/O device 206 may further include braille I/O devices, such as, braille keyboards and braille readers.

The I/O device 206 may include one or more electronic UIs (for example first electronic UI 114A and/or second electronic UI 114B). The one or more electronic UIs may include suitable logic, circuitry, and interfaces that may be configured to receive inputs from the circuitry 202 to render, on a display screen, UI elements (for example, the first UI elements and/or the second UI elements), the parameters 204A set by the user 106, the user-feedback associated with the touch-interaction of the HMI device 104, and modified parameters. In at least one embodiment, the one or more electronic UIs may be implemented as a display device including at least one of a resistive touch screen, a capacitive touch screen, or a thermal touch screen. The display device may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate communication between the circuitry 202, the I/O device 206, and the memory 204, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network 112, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

Figure 3:
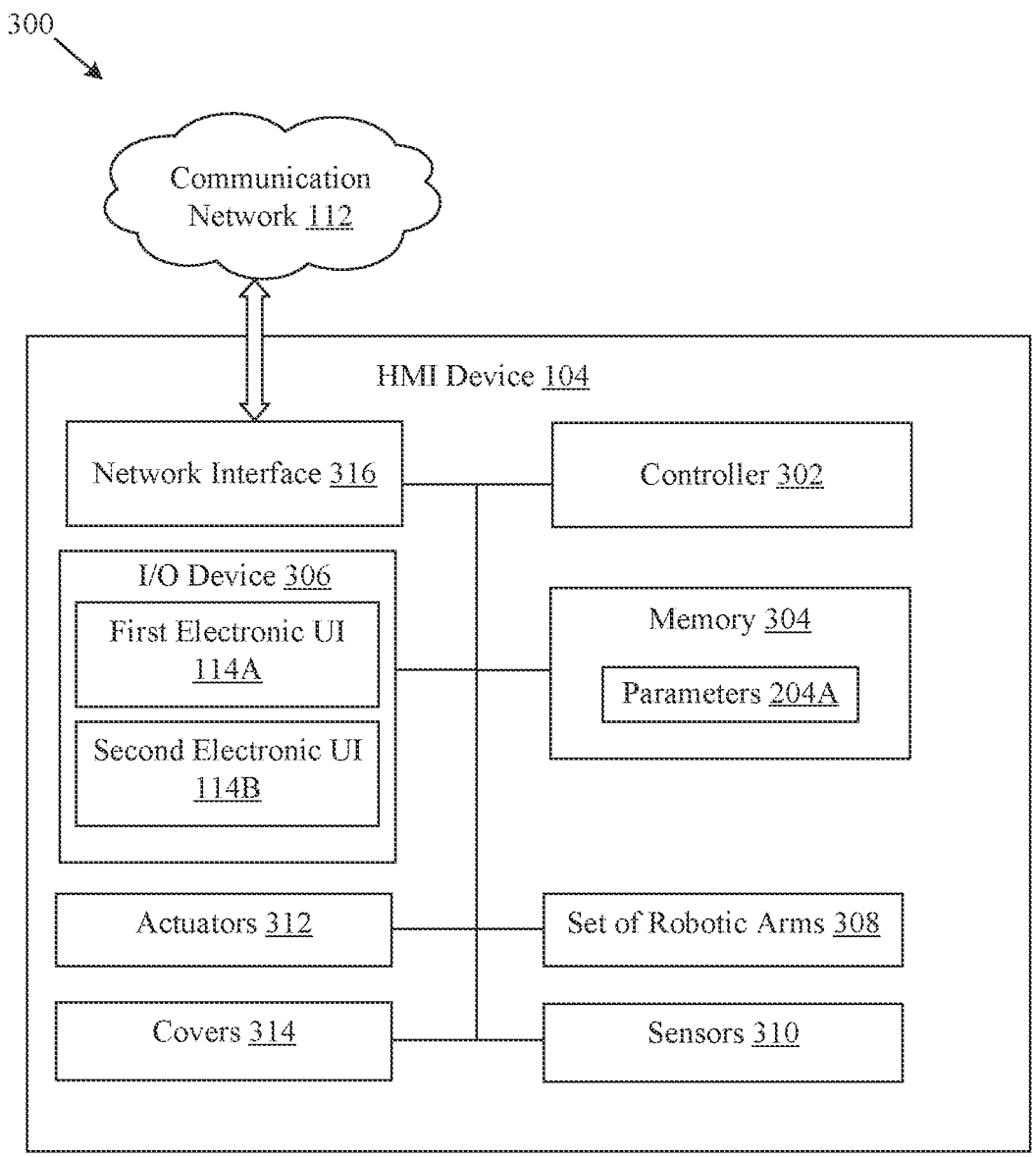
FIG. 3 is a block diagram that illustrates an exemplary HMI device of FIG. 1, in accordance with an embodiment of the disclosure.

FIG. 3 is a block diagram that illustrates an exemplary HMI device of FIG. 1, in accordance with an embodiment of the disclosure. FIG. 3 is explained in conjunction with elements from FIG. 1 and FIG. 2. With reference to FIG. 3, there is shown a block diagram 300 of the HMI device 104. The HMI device 104 may include a controller 302, a memory 304, an input/output (I/O) device 306, a set of robotic arms 308, sensors 310, actuators 312, covers 314, and a network interface 316. In at least one embodiment, the I/O device 306 may also include the first electronic UI 114A and the second electronic UI 114B. In at least one embodiment, the memory 304 may include the parameters 204A. The controller 302 may be communicatively coupled to the memory 304, the I/O device 306, the network interface 316, the set of robotic arms 308, the sensors 310, actuators 312 and covers 314 through wired or wireless communication medium of the HMI device 104.

The controller 302 may include suitable logic, circuitry, and interfaces that may be configured to execute program instructions associated with different operations to be executed by the HMI device 104. The controller 302 may be a computer system that connects to the HMI device 104 in order to control the movements of robot arms (such as, the set of robotic arms 308) of the HMI device 104. In addition to the robot arm, the controller 302 may also be responsible for end-effector and to prevent interference from occurring within the environment. The robotic programs may be coded into the controller 302, using the electronic device 102, via buttons, switches, or a touchscreen to allow for the input of programming commands.

The operations may include controlling rendering of the first electronic UI 114A including first UI elements for input of parameters 204A associated with a touch-interaction of the HMI device 104. The operations may further include reception of the first user input indicative of the parameters 204A based on the control of the rendering of the first electronic UI 114A and the HMI device 104 operation control based on the received first user input. The first electronic UI 114A and the second electronic UI 114B may include similar electronic UI elements (for example second electronic UI element) or may vary based on the user-feedback. The first UI elements may include for example, but not limited to, 'adding waypoint', 'adding hand pose', 'applying force', 'adding time constraint', 'adding arm-motion parameters of the HMI device 104, and the like. The second UI elements may include for example, but not limited to, 'adding second waypoint', 'adding second hand pose', 'applying second force', 'adding second time constraint', 'adding second arm-motion parameters of the HMI device 104, and the like. The second UI elements such as 'adding second hand pose, 'applying second force' and the like may include similar values or may vary based on the user-feedback. The operations may include control of the rendering of the second electronic UI including second UI elements for input of a user-feedback associated with the touch-interaction of the HMI device 104, based on the control of the HMI device 104. A second user input indicative of the user-feedback may be received based on the control of the rendering of the second electronic UI. Further, the operations may include modification of the parameters 204A based on the received second user input and the HMI device 104 may be controlled to operate based on the modified parameters.

The memory 304 may include suitable logic, circuitry, interfaces, and/or code that may be configured to store the program instructions to be executed by the controller 302. The program instructions stored on the memory 304 may enable the controller 302 to execute operations of the controller 302 (and/or the HMI device 104). In at least one embodiment, the memory 304 may store the parameters 204A. The parameters 204A may include the parameters such as, but not limited to, trajectory values associated with a motion of the HMI device 104, pose parameters associated with the HMI device 104, force parameters associated with the HMI device 104, time parameters associated with the touch-interaction and the motion of the HMI device 104, speed parameters associated with the HMI device 104, speed parameters associated with the HMI device 104, and arm-motion parameters associated with the HMI device 104. The memory 304 may further store various values for the parameters 204A such as 'speed', 'force', etc. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 306 may include suitable logic, circuitry, interfaces, and/or code that may be configured to receive an input and provide an output based on the received input. For example, the I/O device 306 may receive a user input from the user 106. The user input may be indicative of operating parameters (for example, speed, force, pose and the like) for the HMI device 104. In some embodiments, the I/O device 306 may receive a user input from the user 106 that may be indicative of the parameters 204A based on the control of the rendering of the electronic UI 114 (the second electronic UI 114B). The input of parameters 204A may be received by the user 106 for controlling the HMI device 104 to operate based on the parameters 204A. Examples of the I/O device 306 may include, but are not limited to, a touch screen, a keyboard, a mouse, a joystick, a microphone, the display device 102B, and a speaker. Examples of the I/O device 306 may further include braille I/O devices, such as, braille keyboards and braille readers.

The I/O device 306 may include one or more electronic UIs (for example, the first electronic UI 114A and/or the second electronic UI 114B). The one or more electronic UIs may include suitable logic, circuitry, and interfaces that may be configured to receive inputs from the controller 302 to render, on a display screen, UI elements (for example, the first UI elements, and/or the second UI elements), the parameters 204A input by the user 106, the user-feedback associated with the touch-interaction of the HMI device 104, and the modified parameters. In at least one embodiment, the one or more electronic UIs may be implemented as a display device that may be at least one of a resistive touch screen, a capacitive touch screen, or a thermal touch screen. The display device may be realized through several known technologies such as, but not limited to, at least one of a Liquid Crystal Display (LCD) display, a Light Emitting Diode (LED) display, a plasma display, or an Organic LED (OLED) display technology, or other display devices.

The actuators 312 may receive signals from the controller 302 and execute the corresponding physical movement. There may be different type of actuators 312 used in the HMI device 104, depending on the load associated with factors such as, but not limited to force, torque, speed of operation, precision, accuracy, and power consumption. The actuators 312 may, for example, receive user input (such as, first user input) from the user 106 to control the operation of the HMI device 104 and the actuator 312 may be operated based on a control command received from the controller 302.

The sensors 310 may measure some attribute of their environment and convert the measured attribute into a signal that can be read or interpreted by the HMI device 104. The sensors 310 may help robots, such as, the HMI device 104, to understand and measure the geometric and physical properties of objects in their surrounding environment, such as position, orientation, velocity, acceleration, distance, size, force, moment, temperature, luminance, weight, etc. The sensors 310 may be essential for robots to operate with a high-level of precision and efficiency, and to interact safely and effectively with their environment and with other machines. The sensors 310 used in the HMI device 104 may include, but not limited to proprioceptive sensors, exteroceptive sensors, light sensors, and sound sensors.

The covers 314 may enhance the capabilities and interactivity of the HMI device 104 using physical add-ons, such as foam, silicone, plastic and fabric. The foam may be a soft material that can be used to fabricate, prototype, and experiment with low-cost soft robots with embedded sensing. It may be integrated with cable-driven electrical actuation systems and soft sensors to create flexible and interactive HMI device 104. The silicone covers may dispensed and cured on a plastic substrate using a computer-controlled, robotic, automated dispensing system. It can be used to create gaskets that seal gaps in the substrate and facilitate assembly or disassembly of mating parts.

The network interface 316 may include suitable logic, circuitry, and interfaces that may be configured to facilitate communication between the controller 302, the I/O device 306, and the memory 304, via the communication network 112. The network interface 316 may be implemented by use of various known technologies to support wired or wireless communication of the HMI device 104 with the communication network 112. The network interface 316 may include, but is not limited to, an antenna, a radio frequency (RF) transceiver, one or more amplifiers, a tuner, one or more oscillators, a digital signal processor, a coder-decoder (CO-DEC) chipset, a subscriber identity module (SIM) card, or a local buffer circuitry.

The network interface 316 may be configured to communicate via wireless communication with networks, such as the Internet, an Intranet, or a wireless network, such as a cellular telephone network, a wireless local area network (LAN), a short-range communication network 112, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

Figure 4:
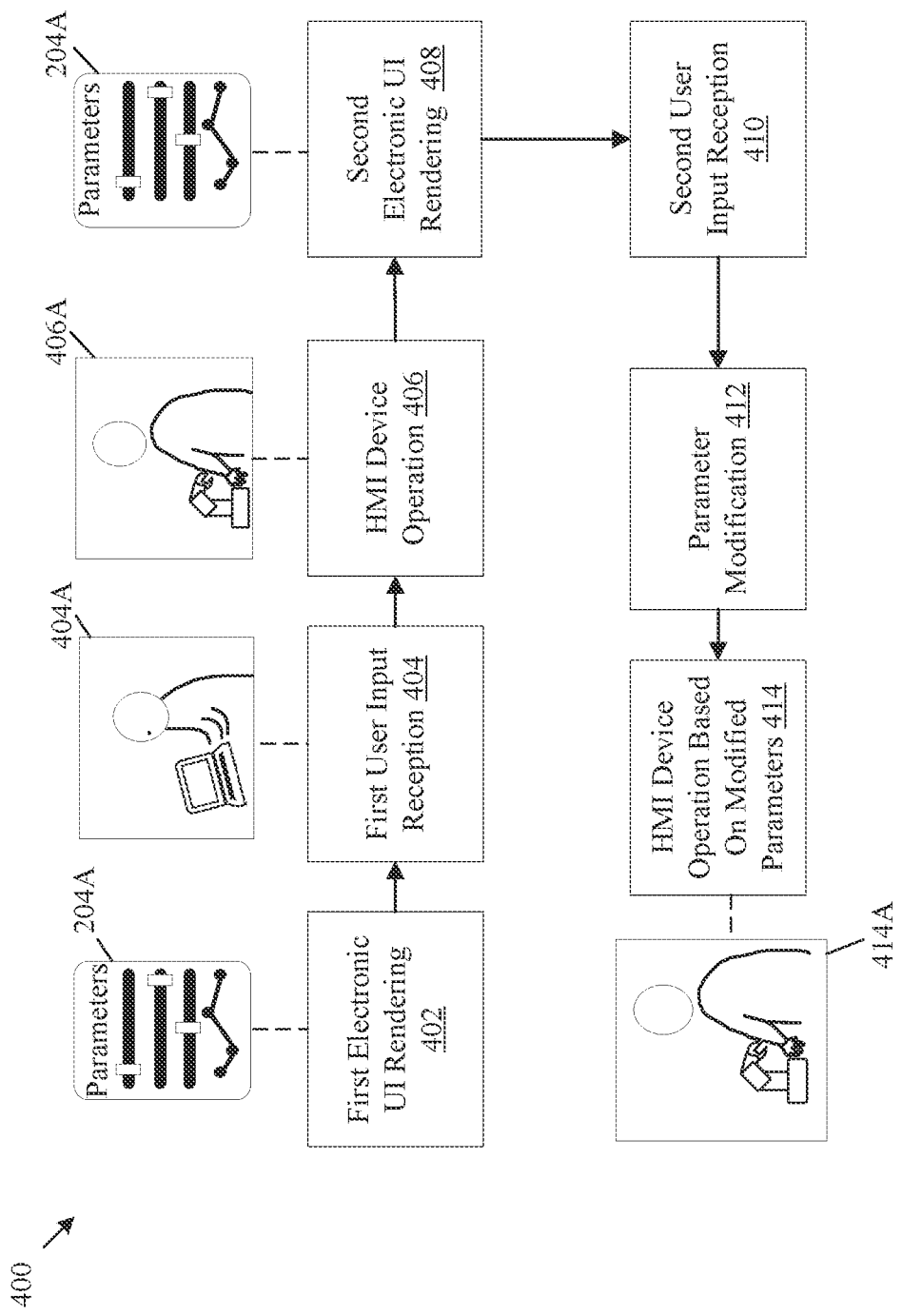
FIG. 4 is a diagram that illustrates a processing pipeline for HMI device touch-interaction control based on user defined parameters, in accordance with an embodiment of the disclosure.

FIG. 4 is a diagram that illustrates a processing pipeline for HMI device touch-interaction control based on user defined parameters, in accordance with an embodiment of the disclosure. With reference to FIG. 4, there is shown an exemplary execution pipeline 400 for control of the HMI device 104 based on user defined parameters 204A for the touch-interaction of the HMI device 104 with the user 106. The execution pipeline 400 may include operations 402 to 414 executed by a computing device, such as, the electronic device 102 of FIG. 1 or the circuitry 202 of FIG. 2.

At 402, first electronic UI rendering may be controlled. The circuitry 202 may be configured to control rendering of the first electronic UI 114A including first UI elements for input of the parameters 204A associated with the touch-interaction of the HMI device 104. The first UI elements may include, for example, but not limited to, UI elements for 'adding waypoint', 'adding hand pose', 'applying force', 'adding time constraint', and 'adding arm-motion parameters', of the HMI device 104, and the like. The user 106 may provide the first user input indicative of the parameters 204A via the first electronic UI 114A. The parameters 204A may include, but are not limited to, trajectory values associated with a motion of the HMI device 104, pose parameters associated with the HMI device 104, force parameters associated with the HMI device 104, time parameters associated with the touch-interaction and the motion of the HMI device 104, speed parameters associated with the HMI device 104, and arm-motion parameters associated with the HMI device 104. In some embodiments, the circuitry 202 may be configured to control renderings of additional electronic UIs (not shown) including UI elements indicative of user-selectable items for setting or modifying selected parameters.

In an embodiment, the circuitry 202 may be configured to control rendering of a third electronic UI including third UI elements indicative of a first user-selectable item for setting trajectory values. The third electronic UI may indicate the user-selectable items, such as, the trajectory values. The user 106 may select the user-selectable items to modify or set the parameters 204A, such as, the trajectory values for controlling the HMI device 104.

In another embodiment, the circuitry 202 may be configured to control rendering of a fourth electronic UI including fourth UI elements indicative of a second user-selectable item for setting pose parameters. The fourth electronic UI may indicate the user-selectable items, such as, the pose parameters. The user may select the user-selectable items to modify or set the parameters 204A, such as, the pose parameters for controlling the HMI device 104.

In yet another embodiment, the circuitry 202 may be configured to control rendering of a fifth electronic UI including the fifth UI elements indicative of a third user-selectable item for setting force parameters. The fifth electronic UI may indicate the user-selectable items, such as, the force parameters. The user 106 may select the user-selectable items to modify or set the parameters 204A, such as, the force parameters for controlling the HMI device 104.

In yet another embodiment, the circuitry 202 may be configured to control rendering of a sixth electronic UI including sixth UI elements indicative of a fourth user-selectable item for setting time parameters. The sixth electronic UI may indicate the user-selectable items, such as, the time parameters. The user 106 may select the user-selectable items to modify or set the parameters 204A, such as, the time parameters for controlling the HMI device 104. The fourth user-selectable item corresponds to the first slider tuning the time parameters.

In yet another embodiment, the circuitry 202 may be configured to control rendering of a seventh electronic UI including seventh UI elements indicative of a fifth user-selectable item for setting speed parameters. The seventh electronic UI may indicate the user-selectable items, such as, the speed parameters. The user 106 may select the user-selectable items to modify or set the parameters 204A, such as, the speed parameters for controlling the HMI device 104. The fifth user-selectable item may correspond to a second slider for tuning the speed parameters.

In yet another embodiment, the circuitry 202 may be configured to control rendering of an eighth electronic UI including eighth UI elements indicative of a sixth user-selectable item for setting arm-motion parameters. The eighth electronic UI may indicate the user-selectable items, such as, the arm-motion parameters. The user 106 may select the user-selectable items to modify or set the parameters 204A, such as, the arm-motion parameters for controlling the HMI device 104. The sixth user-selectable item may correspond to a set of third slider for tuning the arm-motion parameters.

In some embodiment, the HMI device 104 may include a selectable touch-interaction surface for providing a touch-based contact to the user 106, and the touch-interaction surface may correspond to, for example, but not limited to, a foam-based cover associated with the HMI device 104, a silicone-based cover associated with the HMI device 104, a plastic-based cover associated with the HMI device 104, and a fabric-based cover associated with the HMI device 104. An example of an electronic UI is described further, for example, in FIG. 6.

At 404, the first user input may be received. The circuitry 202 may be configured to receive the first user input indicative of the parameters 204A based on the control of the rendering of the first electronic UI 114A. The first user input may include for example, trajectory values (for example, from a start point "A" to an end point "B"), pose parameters (for example, a matrix of orientation angles), force parameters (for example, "15N"), time parameters (for example, "3 s"), speed parameters (for example, 20%), and arm-motion parameters (for example, "(155, 500)"). The first user input may be given by the user 106 via the first electronic UI 114A. The user 106 may manipulate the parameters 204A using the first UI elements displayed on the first electronic UI 114A.

At 406, the HMI device may be controlled to operate based on the received first user input. The circuitry 202 may be configured to control the HMI device 104 to perform a specific task based on the received first user input. The received first user input may include the input of the parameters 204A associated with the touch-interaction of the HMI device 104 with the user 106. For example, the first user input may be indicative of the parameters to be used to control the HMI device 104. The electronic device 102 may query the server 108 (and/or the database 110) to extract a set of instructions associated with the parameters indicated in the first user input. Based on the extracted set of instructions, the electronic device 102 may control the operation of the HMI device 104. In another example, the electronic device 102 may transmit the parameters received in the first user input to the server 108 (and/or the database 110). The server 108 (and/or the database 110) may retrieve the set of instructions associated with the parameters and control the operation of the HMI device 104, based on the set of instructions. In an embodiment, the set of instructions may correspond to a set of programming instructions based on which the HMI device 104 may execute a set of predetermined actions.

At 408, second electronic UI rendering may be controlled. The circuitry 202 may be configured to control the rendering of the second electronic UI 114B including the second UI elements for input of the user-feedback associated with the touch-interaction of the HMI device 104, based on the control of the HMI device 104. In an example, based on the control of the HMI device 104 by the electronic device 102, the HMI device 104 may execute certain actions and interact with the user 106. The interaction may include a touch-based interaction. The user 106 may wish to provide feedback associated with the touch-interaction. The electronic device 102 and/or the HMI device 104 may host the second electronic UI 114B and provide second UI elements for the user 106 to provide the feedback associated with the touch-interaction of the user 106 with the HMI device 104.

At 410, the second user input may be received. The circuitry 202 may be configured to receive the second user input indicative of the user-feedback associated with the touch-interaction, based on the control of the rendering of the second electronic UI 114B. The second user input may be received by the electronic device 102, indicative of the user-feedback. The user-feedback may include the safety values or comfort values of the user 106 based on the experience with the HMI device 104. For instance, the safety value may correspond to a user perceived safety or a level of safety of the user 106 when interacting or operating a robot. The perceived safety may be influenced by many factors, such as the robot's appearance, behavior, capabilities, trustworthiness, and communication. The perceived safety can affect a user's acceptance, confidence, and performance in the HMI device 104. Further, the comfort level may be a level of comfort experienced by the user 106 during the interaction with the robot.

At 412, the parameters may be modified based on the received second user input. The circuitry 202 may be configured to modify the parameters 204A based on the received second user input. The received second user input may include the user-feedback on the touch-interaction of the HMI device 104 with the user 106. Further, the received second user input may include instructions to modify the parameters 204A based on the user feedback. For example, the force parameters applied by the HMI device 104 may be higher than a comfort level of the user 106. The user 106 may wish to reduce the force so that the force applied by the HMI device 104 on the user 106 may be tolerable. In such case, the second user input received from the user 106 may include the modified values of the force. For example, a modified value (e.g., "8N") of the force parameter may correspond to a 20% reduction (e.g., a reduction of "2N") from the current value (e.g., "10N") of the force parameter.

At 414, the HMI device may be controlled to operate based on the modified parameters. The circuitry 202 may be configured to control the HMI device 104 to operate based on the modified parameters. For example, an initial value of the force parameter may be "10N". Based on an application of the initial value of the force on the user 106 by the HMI device 104, the user 106 may provide a user-feedback (for example, via the second user input). For example, the user-feedback may be an instruction that the force parameter be reduced by 20% from "10N" to "8N". In an example, the user 106 may feel the force of "10N" to be uncomfortable and thus may wish to reduce the force. Accordingly, the modified value of the force parameter may be set as "8N". The circuitry 202 may control the HMI device 104 to operate such that the HMI device 104 now applies only "8N" of force on the user 106.

Figure 5A:
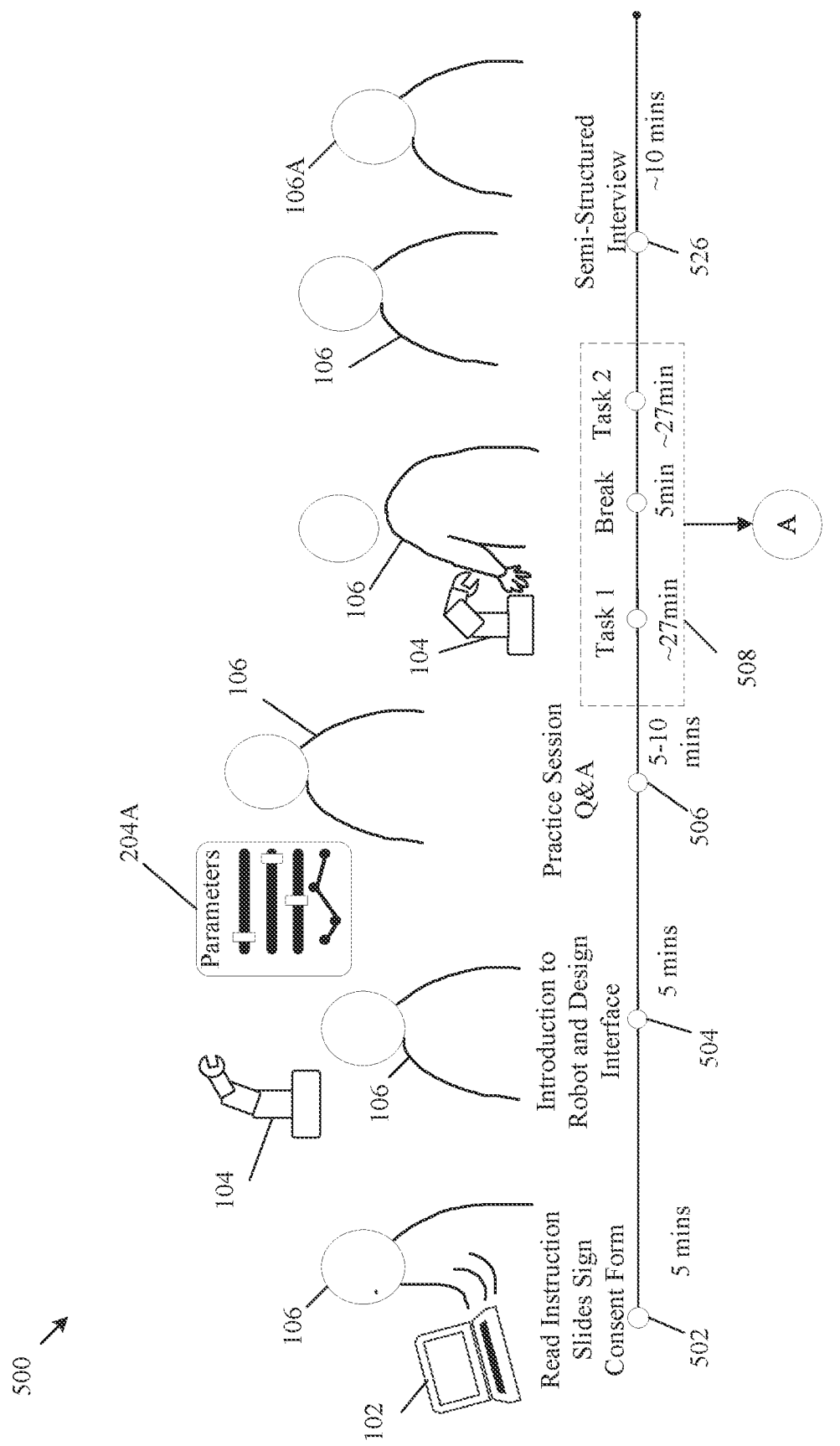
FIGS. 5A, 5B and 5C are diagrams that collectively illustrate an exemplary scenario of timelines of a human-machine interaction between a user, the HMI device, and the electronic device, in accordance with an embodiment of the disclosure.
Figure 5B:
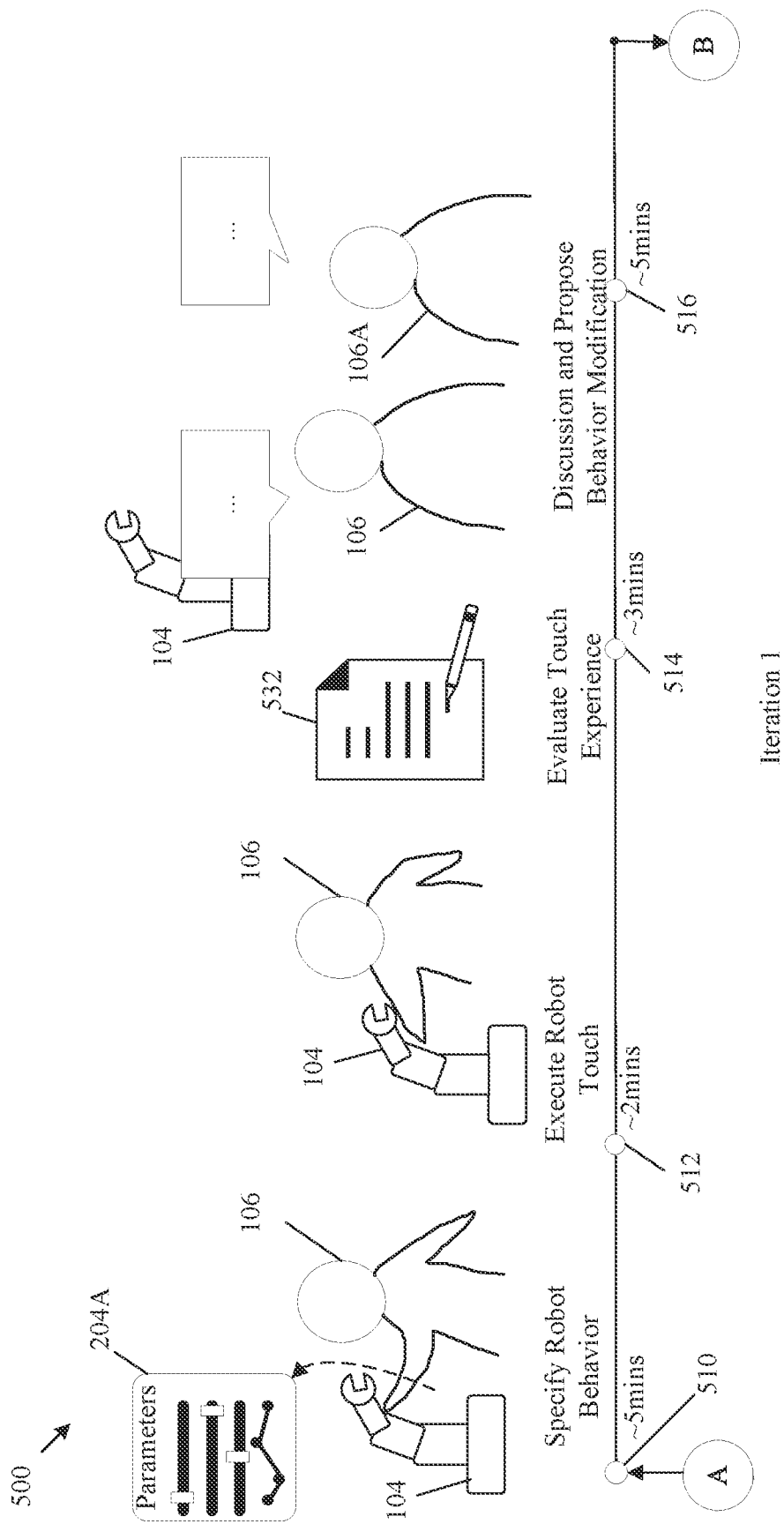
Figure 5C:
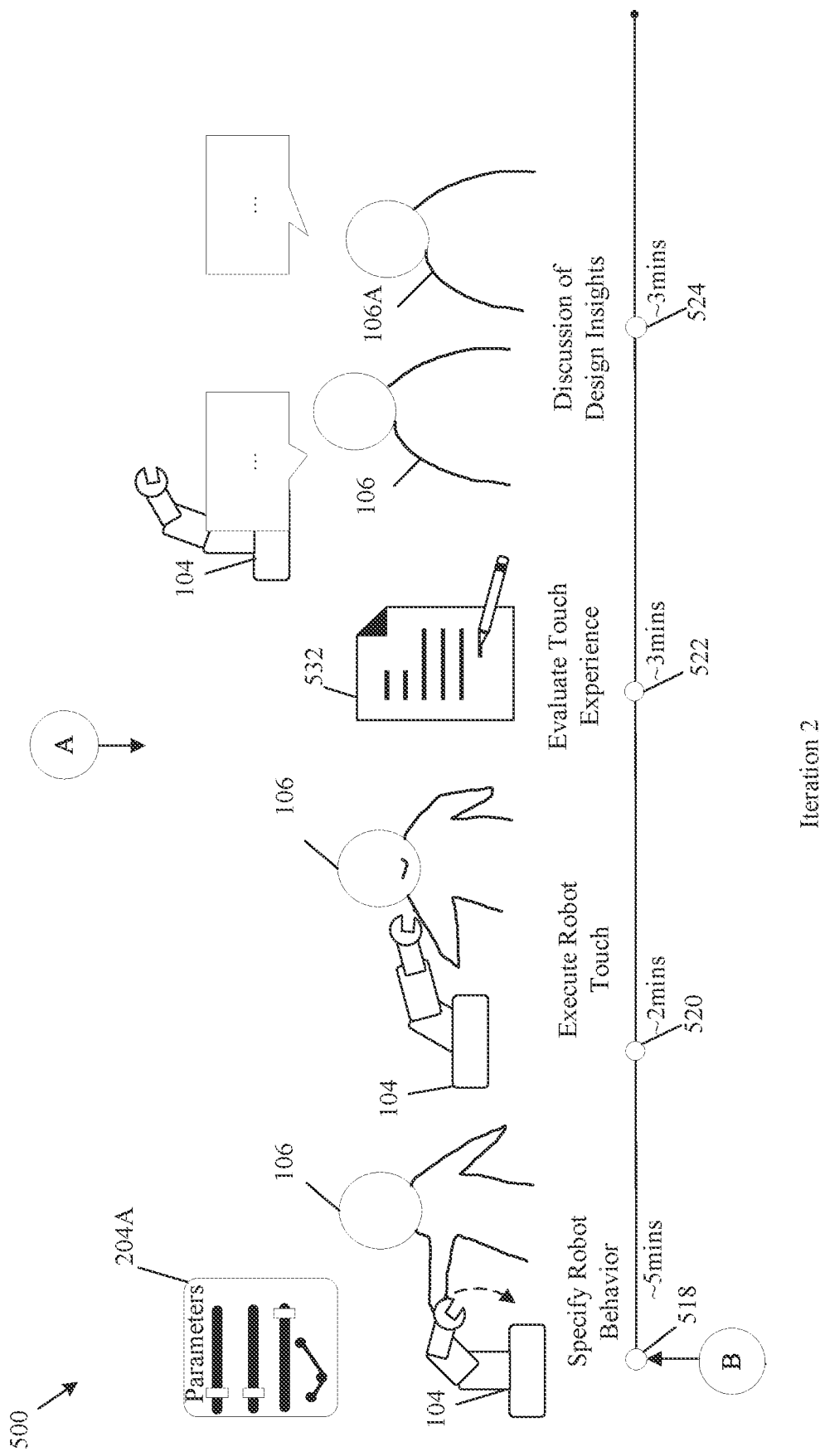

FIGS. 5A, 5B and 5C are diagrams that collectively illustrate an exemplary scenario of timelines of a human-machine interaction between a user, the HMI device, and the electronic device, in accordance with an embodiment of the disclosure. FIGS. 5A, 5B and 5C are explained in conjunction with elements from FIGS. 1, 2, 3, and 4. With reference to FIGS. 5A, 5B, and 5C, there is shown an exemplary scenario 500 including timelines of a human-machine interaction between the user 106, the HMI device 104, and the electronic device 102. With reference to FIG. 5A, there is shown a first timeline of the scenario 500, wherein the first timeline illustrates a first sequence of operations 502 to 526. The first sequence of operations may be executed by the electronic device 102.

In the first timeline of FIG. 5A, the human-machine interaction may be analyzed and adjusted by the user 106. The parameters 204A may be modified to accordingly operate the HMI device 104, based on the user-feedback. The human-machine interaction analyses and adjustment may include several steps such as, but not limited to, 'reading instruction related to the HMI device 104' (at step 502), 'introduction to HMI device 104 and design interface' (at step 504), 'practice session/questions & answers (Q&A)/training session' (at step 506), 'performing tasks' (at step 508), and 'semi-structured evaluation process' (at step 526).

At step 502, instructions related to the HMI device 104 may be read by the user 106. In an example, the instructions may be read for an approximate duration of 5 minutes. The user 106 may read the instructions provided corresponding to the electronic device 102. The instruction may be stored in the electronic device 102 or may be read manually using a physical copy of an instruction manual. The instruction manual may include a document (physical/digital) that provides a clear and concise instructions on how to use, operate, and maintain a product or system. It may include key information about the HMI device 104, such as its dimensions, features, functions, materials, and production information. The instruction manual may also include step-by-step instructions for using the HMI device 104, with visual aids such as diagrams, pictures, or videos if possible. Once the user 106 reads the instructions, a consent form may be signed by the user 106.

At step 504, introduction to the HMI device 104 and its design interface may be performed by the user 106. In an example, the introduction may be performed for an approximate duration of 5 minutes. The introduction to the HMI device 104 and its design interface may help the user 106 understand the purpose, features, and capabilities of the robot, as well as how to connect and interact with it. There may be different types of HMI devices (e.g., the HMI device 104) or robots and interfaces, depending on the control and programming approach, the environment and task, and the human-machine interaction. For example, some robots may automatically perform complex tasks in various environments, while others may require complete human intervention for their operation. Some interfaces may use a Robot Operating System (ROS), which may be a framework that provides a painless entry point for non-professionals in the field of programming robots.

At step 506, human interaction with the HMI device 104 may be practiced. The human interaction may be practiced using parameters 204A, such as, but not limited to, speed, force, and trajectory that may influence movement and interactions of the HMI device 104. For instance, HMI device 104 may be programmed to respond to the physical human interventions by adjusting its trajectory. The user 106 may be provided with a question answer session (for example for approximately 5-10 minutes). The parameters 204A may be set by the user 106 in a practice session based on the introduction and design interface given to the user 106. In an embodiment, the practice session may include the HMI device 104 or an electronic UI alone, wherein the electronic UI may be hosted on the electronic device 102 and/or the HMI device 104.

At step 508, the user 106 may perform tasks in coordination with the HMI device 104. The user 106 may command the HMI device 104 (e.g., a robot) to perform tasks (for example, a "Task 1", a "Task 2", and a "Task 3", etc.). For example, the duration of the "Task 1" may be around 25 minutes. The "Task 1" may include, for example, but is not limited to, 'a surgical assistance using the HMI device 104'. The "Task 1" may include the HMI device 104 that may interact with the user 106 to provide surgical assistance. A break may be taken before starting "Task 2" (for example, for approximately 5 minutes).

In case of an example of healthcare, an interaction between a robot (e.g., the HMI device 104) and a user (e.g., the user 106) may be observed. The robots may assist users who are recovering from injuries or surgeries. For instance, a robotic arm may help a patient perform physio-therapy exercises. The robot may adjust its support based on the user's force and movement, providing just enough assistance to help the patient complete the movement without taking over completely, which may allow the patient to rebuild strength and regain a range of motion over time. The "Task 2" may be performed based on the update of the parameters 204A received as user-feedback on a previous touch-interaction between the HMI device 104 and the user 106. In an example, the HMI device 104 may include, but is not limited to, social HMI devices, collaborative HMI device, prosthetics and exoskeletons, teleoperated HMI devices, and the like.

With reference to FIG. 5B, the "Task 1" may be performed based on a user input given by the user 106. FIG. 5B includes a second timeline of steps 510 to 516 that may correspond to a first iteration (i.e., "iteration 1") of the touch-interaction of the HMI device 104 with the user 106A. At step 510, the parameters 204A may be set. The parameters 204A may include, for example, the trajectory values associated with a motion of the HMI device 104, the pose parameters associated with the HMI device 104, the force parameters associated with the HMI device 104, the time parameters associated with the touch-interaction and the motion of the HMI device 104, the speed parameters associated with the HMI device 104, and the arm-motion parameters associated with the HMI device 104. The trajectory values may be specified by the user 106 before initiating the touch-interaction. Similarly, the pose parameters (for example, a matrix of orientation angles), force parameters (for example, "15N"), time parameters (for example, "3 s"), speed parameters (for example, "20%") may be set. Thus, an input indicative of the HMI device 104 behavior may be specified (based on the parameters 204A), at step 510.

At step 512, a robotic touch-interaction may be executed based on an operation of the HMI device 104 (for example, for approximately 1 minute). The behavior of the HMI device 104 may be recorded based on capture of data on how users (such as, the user 106) interact with the HMI device 104. The data capture may include tracking user inputs, system responses, and the overall performance of the interaction process. To effectively record the behavior of the HMI device 104, various methods and technologies can be employed, such as, but not limited to, User-Centered Design (UCD). The UCD may include determination of an association between the users, their tasks, and environments, to design products that meet needs of the users. Continuous user-feedback may be essential for refining the HMI device 104. The touch-interaction of the HMI device 104 with the user 106 may be monitored, once the HMI device 104 operates according to the parameters 204A provided by the user 106. Further, the user-feedback on the touch-interaction (e.g., the touch interaction) of the HMI device 104 may be recorded. In an example, the user-feedback may include modified values of the parameters 204A.

At step 514, the user-feedback may be evaluated and recorded by the user 106. Evaluated data 532 may be stored physically or digitally (for example, in the memory 204, the memory 304, and/or the database 110). The evaluated data 532 may be used by robot designers to improve/enhance the HMI device 104 and better configure the HMI device 104 for the user 106.

At 516, the behavior data may be discussed by the user 106 (e.g., a first user) with another user 106A (e.g., a second user). Based on the behavior data discussion between the user 106 and the user 106A, the parameters 204A may be modified. The modified values of the parameters 204A may be used to change the behavior of the HMI device 104.

With reference to FIG. 5C, the "Task 2" may be performed based on a user input given by the user 106. FIG. 5C includes a third timeline of steps 518 to 524 that may correspond to a second iteration (i.e., "iteration 2") of the touch-interaction of the HMI device 104 with the user 106A. At step 518, the behavior of the HMI device 104 may be specified (for example, for approximately 5 minutes). The behavior may include various parameters 204A (such as, speed, pose, force, and the like). Recording the behavior of the HMI device 104 may involve capturing data on how users interact with the system. The data capture may include tracking user inputs, system responses, and the overall performance of the interaction process.

At 520, a robotic touch-interaction may be executed based on an operation of the HMI device 104 (for example, for approximately 1 minute). The behavior of the HMI device 104 may be recorded based on capture of data on how users (such as, the user 106) interact with the HMI device 104. The data capture may include tracking user inputs, system responses, and the overall performance of the interaction process. To effectively record the behavior of the HMI device 104, various methods and technologies can be employed, such as, but not limited to, User-Centered Design (UCD). The UCD may include determination of an association between the users, their tasks, and environments, to design products that meet needs of the users. Continuous user-feedback may be essential for refining the HMI device 104. The touch-interaction of the HMI device 104 with the user 106 may be monitored, once the HMI device 104 operates according to the parameters 204A provided by the user 106. Further, the user-feedback on the touch-interaction (e.g., the touch interaction) of the HMI device 104 may be recorded. In an example, the user-feedback may include modified values of the parameters 204A.

At 522, the user-feedback may be evaluated and recorded by the user 106. The evaluated data 532 may be stored physically or digitally (for example, in the memory 204, the memory 304, and/or the database 110). The evaluated data 532 may be used by robot designers to improve/enhance the HMI device 104 and better configure the HMI device 104 for the user 106.

At 524, the behavior data may be discussed by the user 106 (e.g., a first user) with another user 106A (e.g., a second user) (for example, for approximately 3 minutes). Based on the behavior data discussion between the user 106 and the user 106A, the parameters 204A may be modified. The modified values of the parameters 204A may be used to change the behavior of the HMI device 104. For example, design insights may be discussed between the user 106 and the user 106A. The design insights may be used to improve/enhance the HMI device 104 and better configure the HMI device 104 for the user 106. Also, the design insights may be used to determine optimal values of the parameters 204A for a certain type of task and type of user (e.g., based on an age, gender, height, weight, and built of a user).

Thus, there may be at least two iterations of touch-interactions (between the user 106 and the HMI device 104) and corresponding user-feedback on the touch-interactions. In an example, in the first iteration, coarse-level adjustments may be made to the parameters 204A, based on the user-feedback on the touch-interaction in the first iteration. Further, in the second iteration, fine-level adjustments may be made to the modified values of the parameters 204A, based on the user-feedback on the touch-interaction in the second iteration. For example, the force parameter of the HMI device 104 may be modified from "12N" (which may be an initially set value) to "10N" (which may be a coarser value set based on the user-feedback, e.g., the first user input) in the first iteration. Further, the force parameter may be modified from "10N" (which was set in the first iteration) to "9.8N" (which may be a finer value set based on the user-feedback, e.g., the second user input), in the second iteration.

It should be noted that the scenario 500 including the first timeline, the second timeline, and the third timeline of FIGS. 5A, 5B, and 50, respectively, is for exemplary purposes and should not be construed to limit the scope of the disclosure.

Figure 6:
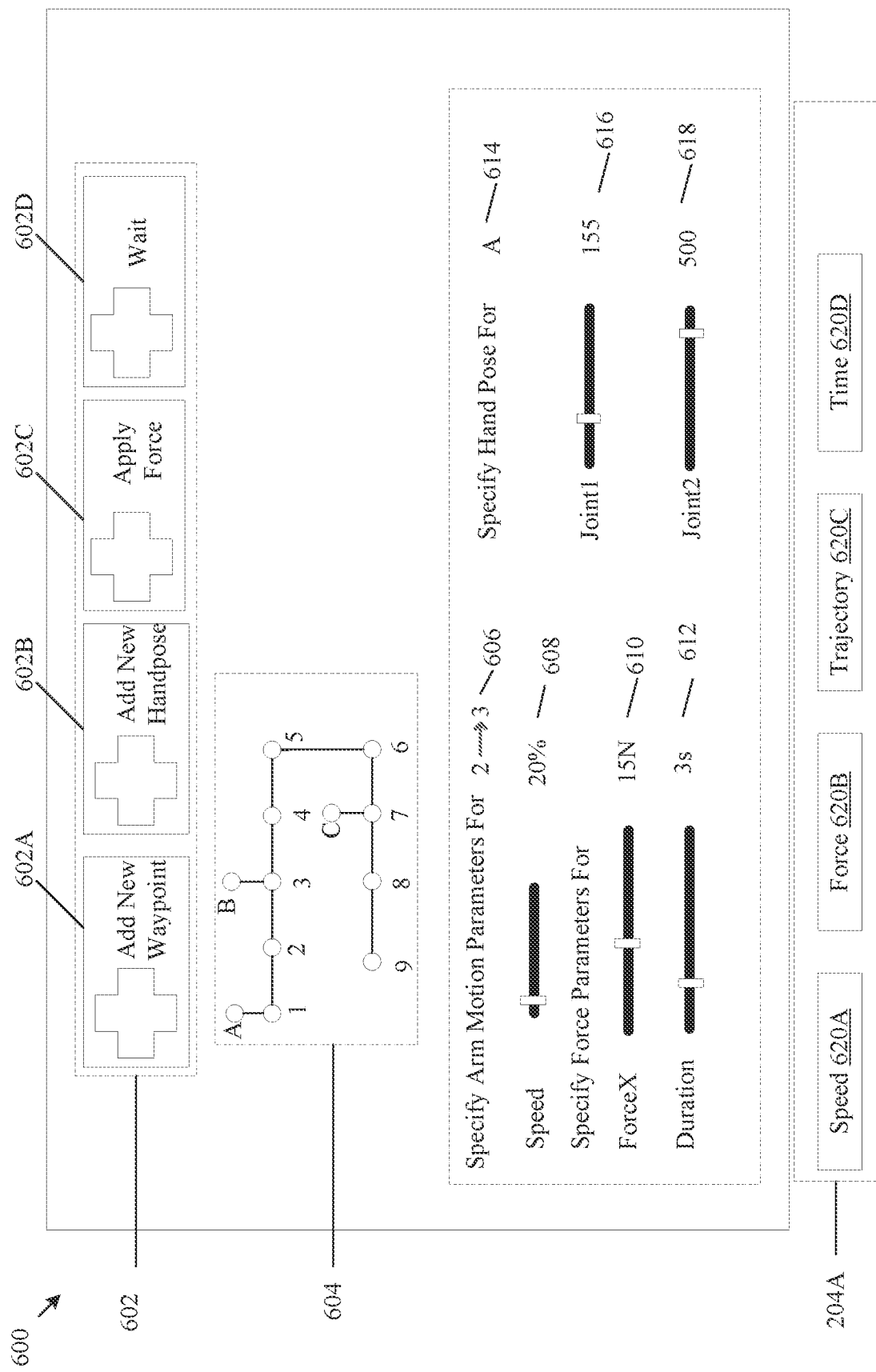
FIG. 6 is a diagram that illustrates an exemplary electronic user interface (UI) for receiving a user input, in accordance with an embodiment of the disclosure.

FIG. 6 is a diagram that illustrates an exemplary electronic user interface (UI) for receiving a user input, in accordance with an embodiment of the disclosure. FIG. 6 is described in conjunction with elements from FIGS. 1, 2, 3, 4, 5A, 5B, and 5C. With reference to FIG. 6, there is shown an exemplary electronic UI 600. The electronic UI 600 may be hosted on the electronic device 102 and/or the HMI device 104 to enable receipt of user inputs from users, such as, the user 106. In an example, the electronic UI 600 may correspond to the first electronic UI 114A and/or the second electronic UI 114B.

The electronic UI 600 may include user-selectable items, such as, a UI element for adding new waypoint (denoted by 602A), a UI element for adding new hand pose (denoted by 602B), a UI element for applying force (denoted by 602C), and a UI element for waiting (denoted by "wait" 602D). The electronic UI 600 may further include a UI element to input trajectory parameters (denoted by 604), and a UI element to input arm motion parameters (denoted by 606). The electronic UI 600 may further include sliders for speed (denoted by 608), for force (denoted by 610), for time/duration (denoted by 612), for control of a first joint (denoted by 616), and for control of a second joint (denoted by 618). Further the electronic UI 600 may include a speed parameter UI 620A (to configure speed parameters), a force parameter UI 620B (to configure force parameters), a trajectory parameter UI 620C (to configure trajectory parameters), and a time UI 620D (to configure a time duration of operation of the HMI device 104).

The user 106 may select the suitable parameters 204A from the various parameters 204A such as speed, force, time, etc. The electronic UI 600 may enable the user 106 to control the HMI device 104 based on multiple options to add various parameters 204A. For example, when the user 106 wishes to add a new waypoint, the UI element 602A (i.e., "Add New Waypoint" 602A) may be selected by the user 106, from the electronic UI 600. Similarly, the trajectory parameters 604 may be selected as shown in FIG. 6. Further, the arm motion parameters 606 may be selected (for example, 2 to 3), and so on.

It should be noted that the electronic UI 600 is for exemplary purposes and should not be construed to limit the scope of the disclosure.

Figure 7:
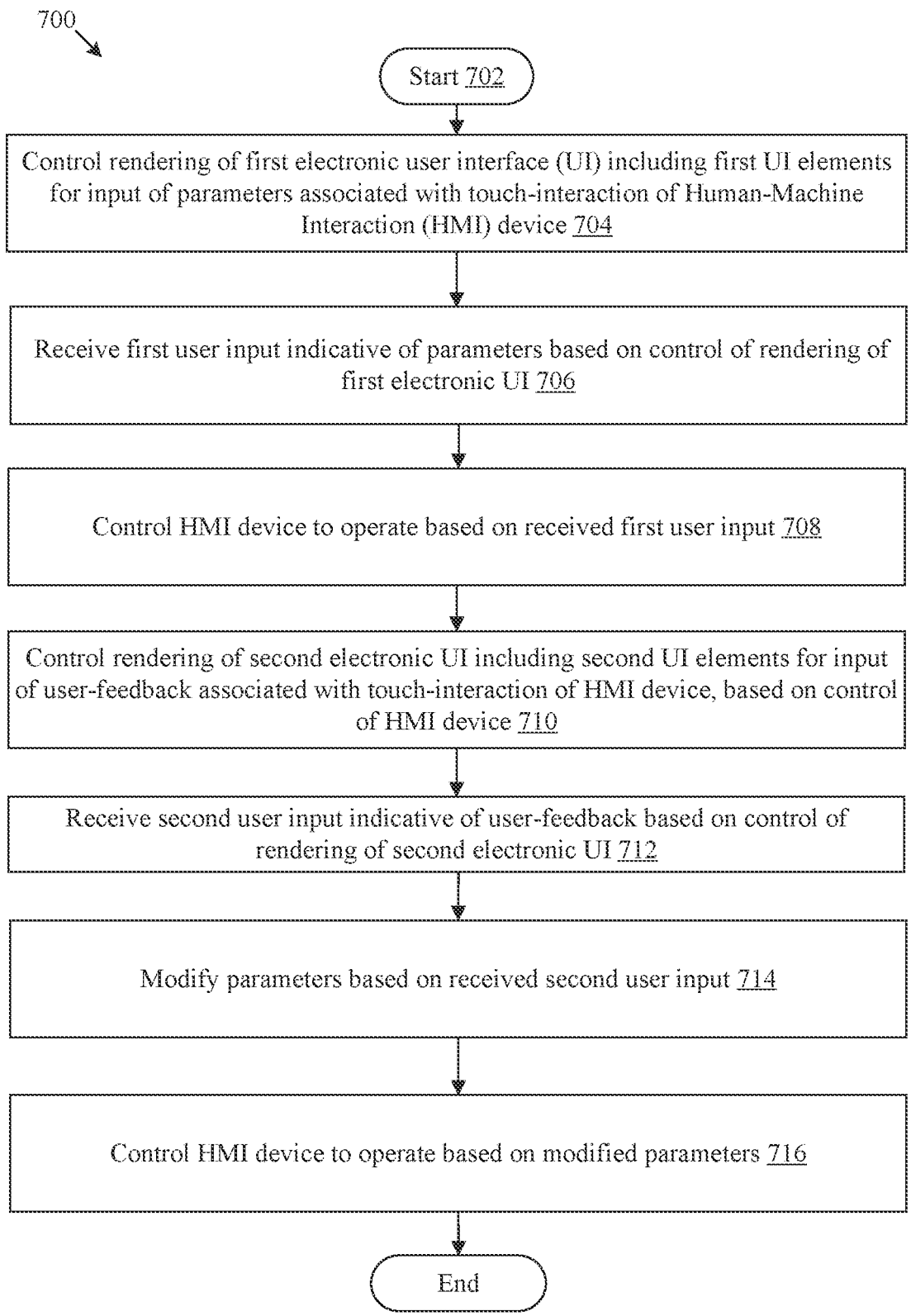
FIG. 7 is a flowchart that illustrates operations of an exemplary method for HMI device touch-interaction control based on user defined parameters, in accordance with an embodiment of the disclosure.

FIG. 7 is a flowchart that illustrates operations of an exemplary method for HMI device control based on user defined touch-interaction parameters, in accordance with an embodiment of the disclosure. FIG. 7 is described in conjunction with elements from FIGS. 1, 2, F3, 4, 5A, 5B, 5C, and 6. With reference to FIG. 7, there is shown a flowchart 700. The flowchart 700 may include operations from 702 to 716 and may be implemented by the electronic device 102 of FIG. 1. The flowchart 700 may start at 702 and proceed to 704.

At 704, rendering of the first electronic UI 114A may be controlled. The first electronic UI 114A may include first UI elements for input of the parameters 204A associated with a user-interaction (e.g., a touch-interaction) of an HMI device 104. The circuitry 202 may be configured to control the rendering of the first electronic UI 114A including the first UI elements for input of the parameters 204A associated with the touch-interaction (e.g., the touch-interaction) with the HMI device 104. The first electronic UI 114A may be implemented as any display device/screen and may include suitable logic, circuitry, and interfaces that may be configured to display an output (e.g., the parameters 204A and their values). The first electronic UI 114A may be a touch screen which may enable the user 106 to provide the user input via the display device of the electronic UI. The touch screen may be, for example, at least one of a resistive touch screen, a capacitive touch screen, or a thermal touch screen. The display device/screen may be realized through several known technologies such as, but not limited to, at least one of a Liquid Crystal Display (LCD) display, a Light Emitting Diode (LED) display, a plasma display, or an Organic LED (OLED) display technology, or other display devices.

The first UI elements may be UI elements that may be configured to enable a user to input the parameters 204A to control the HMI device 104. The parameters 204A may include, but not limited to, trajectory values associated with a motion of the HMI device 104, force parameters associated with the HMI device 104, time parameters associated with the touch-interaction and the motion of the HMI device 104, speed parameters associated with the HMI device 104, and arm-motion parameters associated with the HMI device 104. The user-interaction may refer to communication and collaboration between users 106 and HMI device 104 (for example, robots). It encompasses the interfaces and methods through which the user 106 can instruct, monitor, and interact with the robot. This can include direct manipulation, voice commands, gestures, or other forms of input that allow for a seamless and intuitive experience. The touch-interaction may include a physical contact of the HMI device 104 with the user 106 to perform an action or task (e.g., emergency first aid, health care procedure, etc.) on the user 106. The control of rendering of the first electronic UI is described further, for example, in FIG. 4 (at 402).

At 706, a first user input indicative of the parameters 204A may be received based on the control of rendering of the first electronic UI 114A. The circuitry 202 may be configured to receive the first user input indicative of the parameters 204A, based on the control of the rendering of the first electronic UI 114A. The first user input may be the input given by the user 106. The first user input may include, but not limited to, adding parameter values on the first electronic UI 114A. For example, the speed parameters may be "20%", the force parameters may be "15N", and the like. The first user input may be received by the first electronic UI 114A. The receipt of the first user input is described further, for example, in FIG. 4 (at 404).

At 708, the HMI device 104 may be controlled to operate based on the received first user input. The circuitry 202 may be configured to control the HMI device 104 to operate based on the received first user input. The operation may include, for example, a movement of a robot arm equipped with tactile sensors such that the robot arm performs a touch-based interaction with the user 106. The operation of the HMI device 104 may be control based on the parameters 204A included in the received first user input. The control of the operation of the HMI device is described further, for example, in FIG. 4 (at 406).

At 710, rendering of the second electronic UI 114B may be controlled. The second electronic UI 114B may include second UI elements for input of the user-feedback associated with the touch-interaction of the HMI device 104, based on the control of the HMI device 104. The circuitry 202 may be configured to control the rendering of the second electronic UI 114B, wherein the second electronic UI 114B may include the second UI elements for input of the user-feedback associated with the touch-interaction of the HMI device 104, based on the control of the HMI device 104. The control of the rendering of the second electronic UI is described further, for example, in FIG. 4 (at 408).

At 712, the second user input indicative of the user-feedback may be received, based on the control of the rendering of the second electronic UI 114B. The circuitry 202 may be configured to receive the second user input indicative of the user-feedback, based on the control of the rendering of the second electronic UI 114B. The second user input may include instructions to modify values of certain parameters. The reception of the second user input is described further, for example, in FIG. 4 (at 410).

At 714, the parameters 204A may be modified based on the received second user input. The circuitry 202 may be configured to modify the parameters 204A based on the received second user input. The received second user input may include the user-feedback associated with the touch-interaction of the HMI device 104. For example, the force parameter may be set as "10N" initially, based on the first user input. The circuitry 202 may control the HMI device 104 to operate such that the set "10N" force may be exerted on a hand-portion of the user 106. The user 106 may feel that the exerted force of "10N" may be unsafe or uncomfortable. Accordingly, the user 106 may modify the force parameter and set its value to "8N". The value of "8N" for the force parameter may be provided as the second user input by the user 106. The modification of the parameters is described further, for example, in FIG. 4 (at 412).

At 716, the HMI device 104 may be controlled to operate based on the modified parameters. The circuitry 202 may be configured to control the HMI device 104 to operate based on the modified parameters. The modified values of the parameters 204A may be received in the second user input. Based on the modified values of the parameters 204A, the circuitry 202 may control the operation of the HMI device 104. The control of the HMI device based on the modified parameters is described further, for example, in FIG. 4 (at 414). Control may pass to end.

Although the flowchart 700 is illustrated as discrete operations, such as, 704, 706, 708, 710, 712, 714, and 716 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include control of rendering of a first electronic User Interface (UI) (e.g., the first electronic UI 114A) including first UI elements for input of parameters (e.g., the parameters 204A) associated with a touch-interaction of an HMI device (e.g., the HMI device 104) with a user (e.g., the user 106). The operations may further include reception of a first user input indicative of the parameters 204A based on the control of the rendering of the first electronic UI 114A. The operations may further include control of the HMI device 104 to operate based on the received first user input. The operations may further include control of rendering of a second electronic UI (e.g., the second electronic UI 114B) including second UI elements for input of a user-feedback associated with the touch-interaction of the HMI device 104, based on the control of the HMI device 104. The operations may further include reception of a second user input indicative of the user-feedback based on the control of the rendering of the second electronic UI 114B. The operations may further include modification of the parameters 204A based on the received second user input. The operations may further include control of the HMI device 104 to operate based on the modified parameters.

Exemplary aspects of the disclosure may provide an electronic device (such as, the electronic device 102 of FIG. 1) that includes circuitry (such as the circuitry 202). The circuitry 202 may be configured to control rendering of a first electronic User Interface (UI) (e.g., the first electronic UI 114A) including first UI elements for input of parameters (e.g., the parameters 204A) associated with a touch-interaction of an HMI device (e.g., the HMI device 104) with a user (e.g., the user 106). The circuitry 202 may be further configured to receive a first user input indicative of the parameters 204A based on the control of the rendering of the first electronic UI 114A. The circuitry 202 may be further configured to control the HMI device 104 to operate based on the received first user input. The circuitry 202 may be further configured to control rendering of a second electronic UI (e.g., the second electronic UI 114B) including second UI elements for input of a user-feedback associated with the touch-interaction of the HMI device 104, based on the control of the HMI device 104. The circuitry 202 may be further configured to receive a second user input indicative of the user-feedback based on the control of the rendering of the second electronic UI 114B. The circuitry 202 may further configured to modify the parameters 204A based on the received second user input. The circuitry 202 may be further configured to control the HMI device 104 to operate based on the modified parameters.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:

a display;

at least one input device; and control circuitry including one or more processors configured to:

control rendering of a first electronic user interface (UI) on the display including first UI elements for input of parameters associated with touch-interactions of a Human-Machine Interaction (HMI) device to a user;

receive, from the at least one input device, a first user input indicative of the parameters, based on the rendered first electronic UI;

control the HMI device to operate and move at least one part of the HMI device for a touch-interaction to the user based on the indicated parameters, wherein the touch-interaction includes a physical contact of the HMI device to perform an action or a task on the user;

control rendering of a second electronic UI on the display including second UI elements for input of a user-feedback associated with the touch-interaction of the HMI device to the user, based on the at least one operated part of the HMI device;

receive, from the at least one input device, a second user input indicative of the user-feedback associated with the touch-interaction of the HMI device to the user, based on the rendered second electronic UI;

modify the parameters based on the received second user input; and control the HMI device to operate and move the at least one part of the HMI device for a modified touch-interaction to the user based on the modified parameters.

2. The electronic device according to claim 1, wherein the parameters include at least one of: trajectory values associated with a motion of the HMI device, pose parameters associated with the HMI device, force parameters associated with the HMI device, time parameters associated with the touch-interaction and the motion of the HMI device, speed parameters associated with the HMI device, or arm-motion parameters associated with the HMI device.

3. The electronic device according to claim 2, the circuitry is configured to:
   control rendering of a third electronic UI including third UI elements indicative of a first user selectable item for setting the trajectory values;
   receive a third user input indicative of the set trajectory values based on the control of the rendering of the third electronic UI; and
   control the HMI device to operate based on the set trajectory values associated with the received third user input.

4. The electronic device according to claim 2, the circuitry is configured to:
   control rendering of a fourth electronic UI including fourth UI elements indicative of a second user selectable item for setting the pose parameters;
   receive a fourth user input indicative of the set pose parameters based on the control of the rendering of the fourth electronic UI; and
   control the HMI device to operate based on the set pose parameters associated with the received fourth user input.

5. The electronic device according to claim 2, the circuitry is configured to:
   control rendering of a fifth electronic UI including fifth UI elements indicative of a third user selectable item for setting the force parameters;
   receive a fifth user input indicative of the set force parameters based on the control of the rendering of the fifth electronic UI; and
   control the HMI device to operate based on the set force parameters associated with the received fifth user input.

6. The electronic device according to claim 2, the circuitry is configured to:
   control rendering of a sixth electronic UI indicative including sixth UI elements indicative of a fourth user selectable item for setting the time parameters;
   receive a sixth user input indicative of the set time parameters based on the control of the rendering of the sixth electronic UI; and
   control the HMI device to operate based on the set time parameters associated with the received sixth user input.

7. The electronic device according to claim 6, wherein the fourth user selectable item corresponds to a first slider for tuning the time parameters.

8. The electronic device according to claim 2, the circuitry is configured to:
   control rendering of the seventh electronic UI including seventh UI elements indicative of a fifth user selectable item for setting the speed parameters;
   receive a seventh user input indicative of the set speed parameters based on the control of the rendering of the seventh electronic UI; and
   control the HMI device to operate based on the set speed parameters associated with the received seventh user input.

9. The electronic device according to claim 8, wherein the fifth user selectable item corresponds to a second slider for tuning the speed parameters.

10. The electronic device according to claim 2, the circuitry is configured to:
    control rendering of the eighth electronic UI including eighth UI elements indicative of a sixth user selectable item for setting the arm-motion parameters;
    receive an eighth user input indicative of the set arm-motion parameters based on the control of the rendering of the eighth electronic UI; and
    control the HMI device to operate based on the set arm-motion parameters associated with the received eighth user input.

11. The electronic device according to claim 10, wherein the sixth user selectable item corresponds to a set of third sliders for tuning the arm-motion parameters.

12. The electronic device according to claim 1, wherein the HMI device further includes an external surface associated with the touch-interaction of the HMI device with the user, and the external surface corresponds to at least one of: a foam-based cover associated with the HMI device, a silicone-based cover associated with the HMI device, or a plastic-based cover associated with the HMI device.

13. A method, comprising:
    in an electronic device:
        controlling rendering of a first electronic user interface (UI) on a display including first UI elements for input of parameters associated with touch-interactions of a Human-Machine Interaction (HMI) device;
        receiving, from at least one input device, a first user input indicative of the parameters based on the rendered first electronic UI;
        controlling the HMI device to operate one or more actuators configured to move at least one part of the HMI device for a touch-interaction to a user based on the indicated parameters, wherein the touch-interaction includes a physical contact of the HMI device to perform an action or a task on the user;
        controlling rendering of a second electronic UI on the display including second UI elements for input of a user-feedback associated with the touch-interaction of the HMI device to the user, based on the at least one moved part of the HMI device;
        receiving, from the at least one input device, a second user input indicative of the user-feedback based on the rendered second electronic UI;
        modifying the parameters based on the received second user input; and
        controlling the HMI device to operate the one or more actuators to move the at least one part of the HMI device for a modified touch-interaction to the user based on the modified parameters.

14. The method according to claim 13, further comprising:
    controlling rendering of a third electronic UI including third UI elements indicative of a first user selectable item for setting the trajectory values;
    receiving a third user input indicative of the set trajectory values based on the control of the rendering of the third electronic UI; and
    controlling the HMI device to operate based on the set trajectory values associated with the received third user input.

15. The method according to claim 13, further comprising:
controlling rendering of a fourth electronic UI including fourth UI elements indicative of a second user selectable item for setting the pose parameters;
receiving a fourth user input indicative of the set pose parameters based on the control of the rendering of the fourth electronic UI; and
controlling the HMI device to operate based on the set pose parameters associated with the received fourth user input.

16. The method according to claim 13, further comprising:
controlling rendering of a fifth electronic UI including fifth UI elements indicative of a third user selectable item for setting the force parameters;
receiving a fifth user input indicative of the set force parameters based on the control of the rendering of the fifth electronic UI; and
controlling the HMI device to operate based on the set force parameters associated with the received fifth user input.

17. The method according to claim 13, further comprising:
controlling rendering of a sixth electronic UI indicative including sixth UI elements indicative of a fourth user selectable item for setting the time parameters;
receiving a sixth user input indicative of the set time parameters based on the control of the rendering of the sixth electronic UI; and
controlling the HMI device to operate based on the set time parameters associated with the received sixth user input.

18. The method according to claim 13, further comprising:
controlling rendering of the seventh electronic UI including seventh UI elements indicative of a fifth user selectable item for setting the speed parameters;
receiving a seventh user input indicative of the set speed parameters based on the control of the rendering of the seventh electronic UI; and
controlling the HMI device to operate based on the set speed parameters associated with the received seventh user input.

19. The method according to claim 13, further comprising:
controlling rendering of the eighth electronic UI including eighth UI elements indicative of a sixth user selectable item for setting the arm-motion parameters;
receiving an eighth user input indicative of the set arm-motion parameters based on the control of the rendering of the eighth electronic UI; and
controlling the HMI device to operate based on the set arm-motion parameters associated with the received eighth user input.

20. A non-transitory computer-readable medium having stored thereon, computer-executable instructions that when executed by a processor, causes the processor to execute operations, the operations comprising:
controlling rendering of a first electronic user interface (UI) on a display device including first UI elements for input of parameters associated with a touch-interaction of a Human-Machine Interaction (HMI) device;
receiving, from at least one input device, a first user input indicative of the parameters based on the rendered first electronic UI;
controlling the HMI device to operate and move at least a part of the HMI device for a touch-interaction to a user based on the indicated parameters, wherein the touch-interaction includes a physical contact of the HMI device to perform an action or a task on the user;
controlling rendering of a second electronic UI on the display device including second UI elements for input of a user-feedback associated with the touch-interaction of the HMI device to the user, based on the operated part of the HMI device;
receiving, from the at least one input device, a second user input indicative of the user-feedback based on the rendered second electronic UI;
modifying the parameters based on the received second user input; and
controlling the HMI device to operate and move the part of the HMI device for a modified touch-interaction to the user based on the modified parameters.

* * * * *